United States Patent [19]
Eldridge et al.

[11] Patent Number: 5,905,200
[45] Date of Patent: *May 18, 1999

[54] CYCLONIC FLOW METERS AND METHOD OF USING SAME

[76] Inventors: Gary Eldridge; Rod Eldridge, both of 17978 Glen Meadow La., Salinas, Calif. 93907

[*] Notice: This patent is subject to a terminal disclaimer.

[21] Appl. No.: 08/855,454
[22] Filed: May 13, 1997
[51] Int. Cl.$^6$ .................................. G01F 5/00; G01F 1/20
[52] U.S. Cl. ........................... 73/202; 73/223; 73/861.32
[58] Field of Search .............................. 73/202, 200, 196, 73/223, 226, 861.32; 364/510

[56] References Cited

U.S. PATENT DOCUMENTS

| | | | |
|---|---|---|---|
| 3,559,482 | 2/1971 | Baker et al. | 73/202 |
| 3,805,609 | 4/1974 | Sato | 73/861.32 |
| 4,089,220 | 5/1978 | Houlberg | 73/861.32 |
| 4,277,832 | 7/1981 | Wong | 364/510 |
| 4,299,703 | 11/1981 | Bezard et al. | 210/512.1 |
| 4,478,718 | 10/1984 | Saget | 210/512.3 |
| 4,688,418 | 8/1987 | Cheung et al. | 73/200 |
| 4,726,902 | 2/1988 | Hubbard | 210/512.2 |
| 4,782,707 | 11/1988 | Yamazaki et al. | 73/861.32 |
| 4,956,091 | 9/1990 | Van Den Akker | 210/512.2 |
| 5,526,684 | 6/1996 | Liu et al. | 73/200 |
| 5,606,135 | 2/1997 | Eldridge et al. | 73/223 |

*Primary Examiner*—Harshad Patel
*Attorney, Agent, or Firm*—Terrance L. Siemens

[57] ABSTRACT

Detection of the flow of a fluid, and also measurement of the flow of a fluid, is provided by feeding the fluid flow through a cylindrical chamber to form a cyclonic circulation of the fluid in the chamber. A movable member is moved by the fluid flow. As one example a ball rotates around the inside of the chamber and the passage of the ball detected, at a particular position. An alternative is an annular member also rotated. There can be an optical detection or electronic detection. Output signal can be generated by the movement. Such signals can be processed to give flow rates. The chamber is positioned in a by-pass flow line, with the flow rate of the by-pass related to the total flow.

26 Claims, 7 Drawing Sheets

CYCLONIC FLOW METERS AND METHOD OF USING SAME

FIELD OF THE INVENTION

This invention relates to apparatus for indicating fluid flow and also for measuring fluid flow, and to methods of indicating fluid flow and for measuring fluid flow.

BACKGROUND OF THE INVENTION

Various forms of apparatus exist for either indicating or measuring fluid flow, or both. Various methods are also known.

Certain disadvantages exist, for example, being subject to clogging, flow rate range limitations, susceptibility to temperature and/or pressure variations, and other problems.

SUMMARY OF THE INVENTION

The present invention provides for the indication of fluid flow, and for the measurement of fluid flow, with high accuracy and avoidance of many of the existing disadvantages.

Broadly, in the present invention, a fluid flow is caused to circulate in a chamber in the flow line, and a member in the chamber is caused to move with the circulating fluid. The movement of a member is monitored, to produce, at the minimum, an indication of its movement and thus an indication of the flow. The movement of the member can be used to produce a signal indicative of the member's speed of movement in the chamber, which signal can be used to give a flow rate measurement.

In one aspect of the invention, a fluid flow indicator and/or flow measuring device comprises a cylindrical chamber having an inlet and an outlet, the inlet positioned at or adjacent to the outer periphery of the chamber and the outlet positioned generally on the axis of the chamber, a movable member located in the chamber and adapted for movement with a fluid flowing in the chamber, and means for determining the movement of the member, for indication of a flow in the chamber. Means can be provided for producing a signal which indicates flow rate. To improve the operation of the flow indicator, particularly for very dirty flow, such as fluids containing high proportions of solids, or other matter, the flow indicator can be positioned in a by-pass, downstream of a cyclonic separator. The flow indicator is fed a relatively clean flow from the separator. An orifice can be positioned in the by-pass downstream of the flow indicator.

In another aspect of the invention, a fluid flow detecting apparatus, comprises a cylindrical chamber having a peripheral wall and spaced opposed end walls; an inlet adjacent one of the end walls, and an outlet; the inlet adapted to cause a cyclonic flow of fluids to circulate inside chamber; a plurality of movable members in the chamber, movable in accordance with changes in fluid flow rate; magnet means extraneous of the chamber for maintaining separation of the movable members and maintaining movement of the members in a generally horizontal plane; and a means for detecting movement of the movable members.

In an alternative arrangement, the flow indicator can be positioned in a by-pass, with a variable flow valve being positioned in the main flow, in parallel with the by-pass. The output signal from the flow indicator is used to control the control signal to the control system of the valve, such that as flow varies through the flow indicator so the opening of the valve is varied, increasing the opening of the valve will increase the flow through the flow indicator and decreasing the opening of the valve will decrease the flow through the flow indicator.

In yet another aspect of the invention, a method of indicating and/or measuring fluid flow comprises providing a fluid flow indicator and/or flow measuring device comprising a cylindrical chamber having an inlet and an outlet in a fluid flow by-pass in a fluid flow system, providing a cyclonic separator upstream of said by-pass, inputting a relatively clean flow from said cyclonic separator into the cylindrical chamber for circulation in the chamber and abstracting the fluid flow from a central position of the chamber to the outlet, positioning a movable member in the chamber for movement with the fluid flow, determining movement of the member, and producing a signal indicative of the movement of the member. Such a member can further produce an output indicative of the flow rate in the chamber.

A further method of indicating and/or measuring fluid flow comprises providing a fluid flow indicator and/or flow measuring device, positioning device in a fluid flow by-pass in a main flow system, providing a variable flow valve in the main flow system in parallel with the by-pass, feeding an output signal from the device, indicative of the flow rate through the device, to a control system of the variable flow rate valve to control the operation of the valve, whereby the flow rate through the valve is increased on increase of the flow through the device and is decreased on decrease of the flow through the device.

Having thus described the invention, reference will now be made to the accompanying drawings illustrating preferred embodiments.

BRIEF DESCRIPTION OF THE DRAWINGS

Similar numerals in the Figures denote similar elements.

DETAILED DESCRIPTION OF THE PREFERRED EMBODIMENTS

Figure 1:
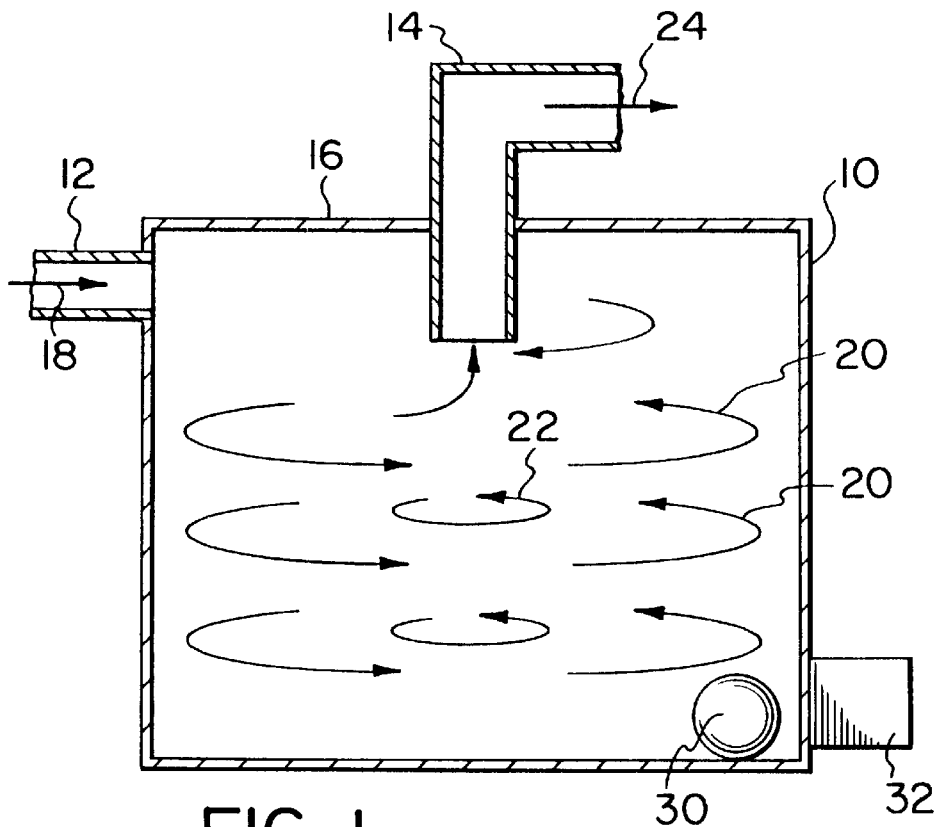
FIG. 1 is a cross-section of the axis of one form of apparatus in accordance with the invention.

As illustrated in FIG. 1, a cylindrical chamber 10 has an inlet 12 and an outlet 14. In the example the inlet is towards the top end 16 of chamber 10 and outlet 14 is on the central axis at the top end. Fluid enters inlet 12, as indicated by arrow 18 and is caused to flow in the chamber in a circulating manner, conveniently referred to as cyclonic. This is indicated by arrows 20 and 22, with fluid flowing out of the outlet 14 as indicated by arrow 24.

Positioned in the chamber 10 is a ball 30. Ball 30 can be of various materials and can be magnetic or non-magnetic. On the outside of the chamber is positioned a sensor 32, for determining movement of the ball 30.

If the ball is of magnetic material, the sensor can comprise an external "Hall" switch which senses the proximity of the ball each time the ball rotates around the chamber. Typically the ball can be of mildly magnetic stainless steel for corrosion resistance, or the ball can be of any convenient material covered by a corrosion resistant material.

As an alternative the ball can be of glass having a white peripheral surface with the sensor being an optical sensor, which, for example, senses by the reflection of light when the ball passes the sensor. The chamber 10, or at least that part of the chamber wall at the position of the sensor, would be optically transparent.

A further form of sensing is by using a sonic transmitting/receiving signal which measures the thickness of the chamber wall, plus the ball when it is in close proximity to the sensor. The signal increases every time the ball circulates past the sensor.

Various other ways of sensing the rotation of the ball can be provided.

Depending upon the desired flow rate to be measured, certain variables can exist, such as the mass of the ball; the outer diameter of the ball, with a greater diameter surface area in contact with the fluid flow; the inner diameter of the chamber, and other variations.

Figure 2:
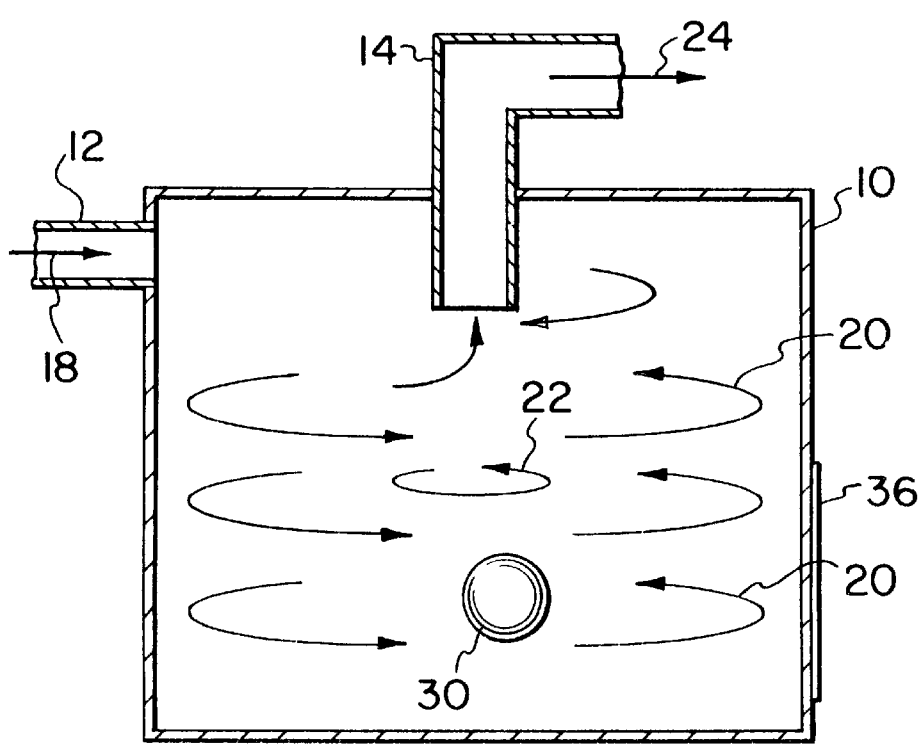
FIG. 2 is a similar cross-section to that of FIG. 1, illustrating an alternative form of apparatus.

It is possible to use visual determination without a external sensor. In FIG. 2, in which common reference numerals are used for items common with FIG. 1, chamber 10 can be of transparent material and the movement of the ball 30 observed. This would provide the basic indication of fluid flow through the chamber.

By the use of a ball 30 of relatively lightweight material, the ball will rise in the center depending upon the flow rate. A suitable scale 36 positioned on the chamber wall can be graduated to give a reading of the flow rate, at the top of the ball, when viewed through the chamber walls. This "viewing" can be done manually or can be carried out by some form of electronic sensing means.

The invention uses a "cyclonic" chamber to create an intentional swirling of the fluid, giving a low pressure area at the center and a high pressure, high velocity stream circulating around the inside of the chamber wall.

Advantage of this "circulating cyclonic flow" include the following: non-obtrusive sensing; self-cleaning and non-clogging; virtually no part wear; temperature and pressure compatible; handles caustic substances; low operating pressure drop; not damaged by over ranging; linear output signal; good rangeability and repeatability; pulsed output.

Typical ranges of flow are from under 1 gpm to over 250 gpm, depending upon chamber and ball sizes specified. The invention can readily be used in lines from ¼ inch input to 2 inch input. The construction can be specialized for other sizes.

There is a wide range of uses of the invention, for example, water utility companies; wastewater treatment plants; petroleum product measurement; caustic fluids/gases; high temperature steam flow; diary products, such as milk; wineries; medical-volume/pressure breath monitoring; viscosity measurement; boat/airplane speed indicators; flow sensor alarm signalling; and mining-gold-waste separation in swirl chamber.

Figure 3:
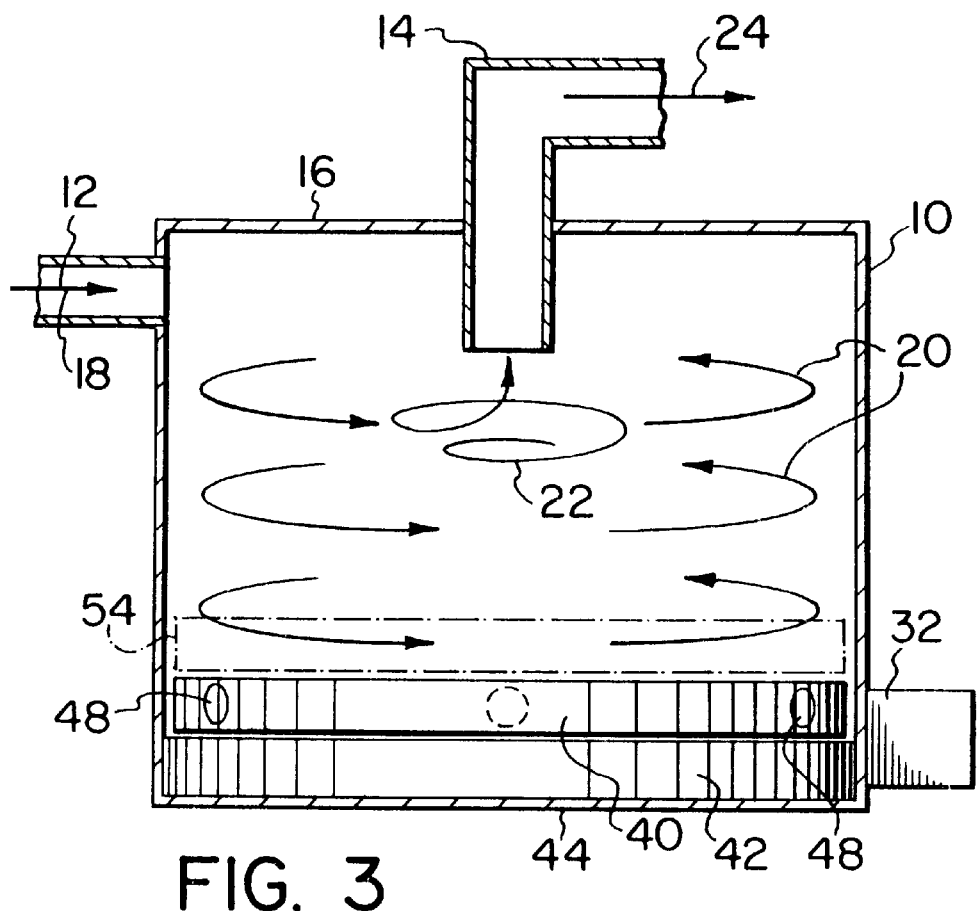
FIG. 3 is a similar cross-section to that of FIGS. 1 and 2, illustrating a further form of apparatus.
Figure 4:
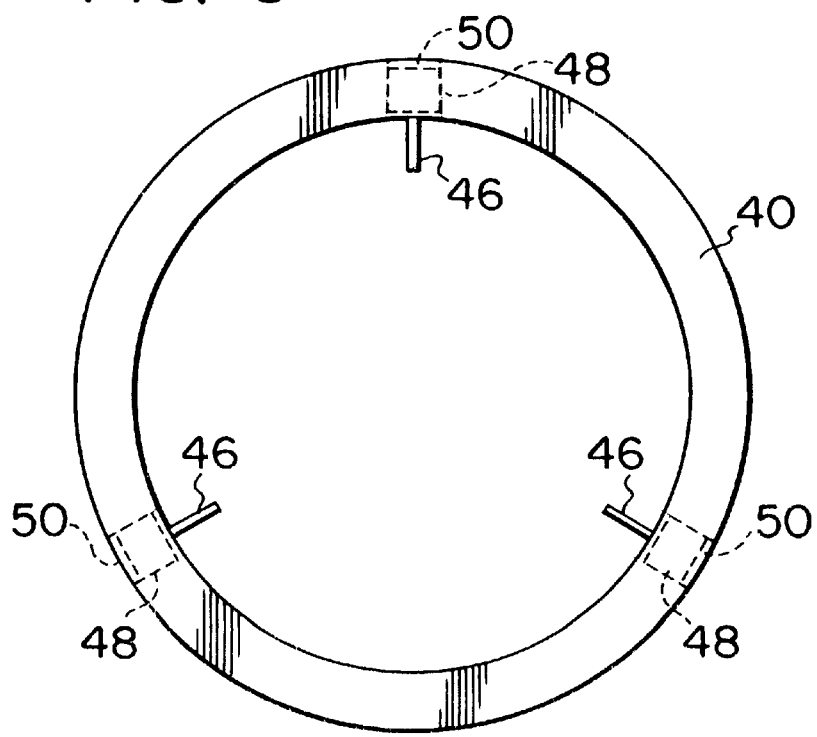
FIG. 4 is a plan view of one form of movable member as used in the apparatus used in FIG. 3.

Instead of the ball 30, other forms of movable member can be used. FIG. 3 illustrates the use of a ring-shaped member 40, FIG. 4 being a plan view of the ring-shaped member. In this example, a movable ring 40 acts in conjunction with a stationary ring 42 which, for example, is attached to the bottom wall 44 of the chamber 10. The movable ring 40 has vanes 46 which cause the ring 40 to rotate as the fluid rotates in the chamber. The vanes can be slightly tilted or inclined, to create a slight downward force in forming a fluid bearing between the movable ring 40 and the stationary ring 42. A fluid bearing is also formed between the outer peripheral wall of the ring 40 and the inner wall surface of the chamber 10.

Inserted into the ring 40 are one or more magnetic members 48. The movement of the members 48 is detected by a sensor 32, as seen in FIG. 1.

A ring type member has less vibration than a ball due to the counterbalanced design. It will function at very high rotating velocities. It is better suited to liquids rather than gases unless the opposed "floatation" surfaces of the movable ring 40 and stationary ring 42 have micro flat surfaces.

The magnetic members 48 can comprise short rods inserted into holes in the member 40, the ends being sealed, at 50, by corrosion resistant material, if desired.

The minimum number of vanes is two, spaced 180° apart, a more ideal being three vanes at 120° apart. More vanes can be used. An example of the tilt of the vanes is from 1° to 5° from a vertical plane.

By the addition of an upper stationary ring, indicated in dotted outline at 54 in FIG. 3, the device can be used with the central axis at an angle to the vertical.

Figure 5:
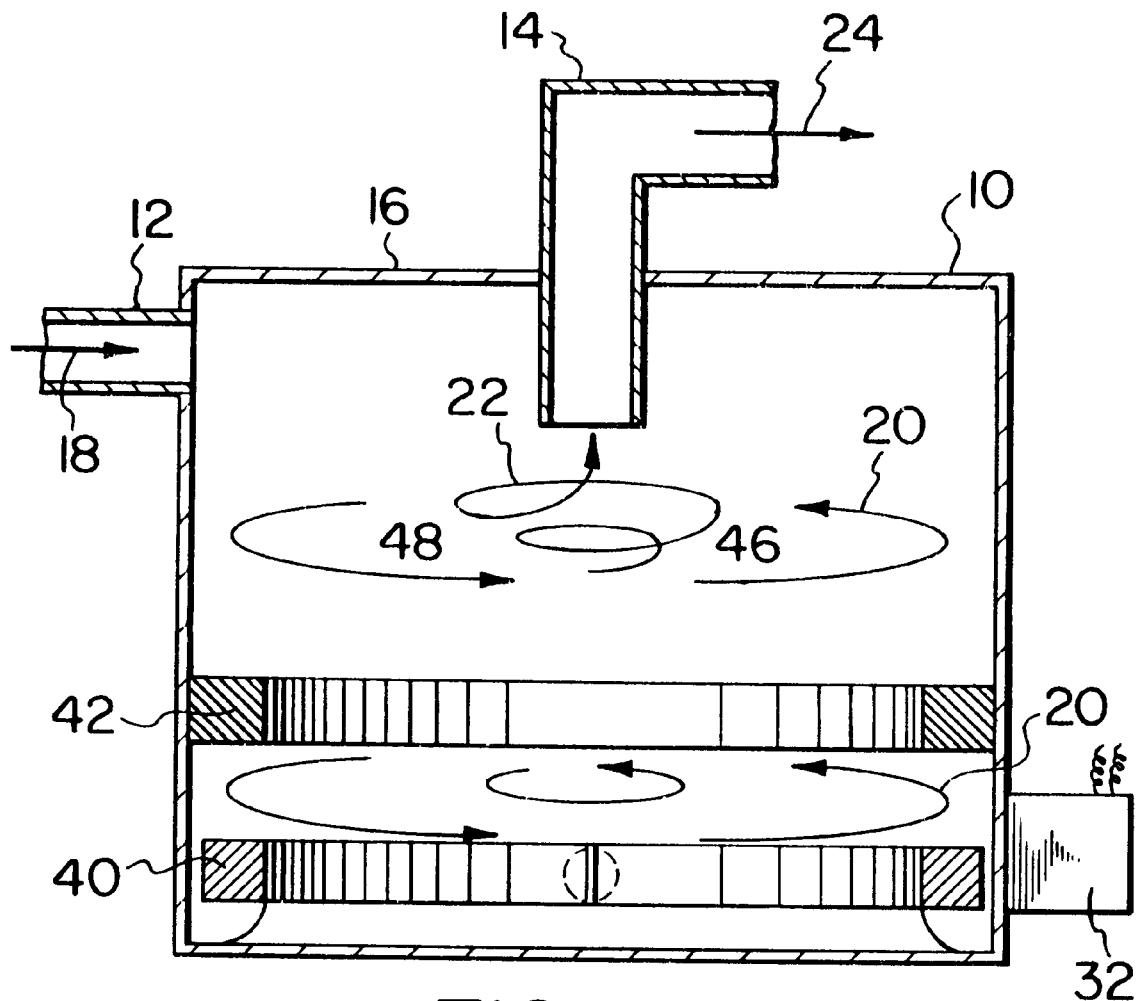
FIG. 5 illustrates a modification on the embodiment illustrated in FIG. 3.

FIG. 5 illustrates a modification of the embodiment illustrated in FIG. 3. In this arrangement, the fixed annular ring is positioned at an intermediate position in the chamber. By positioning the movable ring-shaped member at an intermediate position, for example about half way up the chamber, a higher efficiency is obtained. Also, should there be any heavy particles in the fluid flow, these can drop down to the bottom of the chamber and not interfere with the movable member.

As so far described the vortex or "cyclonic" flow is obtained by inducing the fluid to flow in a circular path. One convenient way of obtaining this is to position the inlet 12 so that it is inclined, for example tangential, to the outer periphery wall of the chamber 10. Another way is to position a vane or deflector at the inner end of the inlet to deflect the flow.

A further arrangement is to provide a member which shapes the vortex flow. This can provide a more efficient apparatus.

Figure 6:
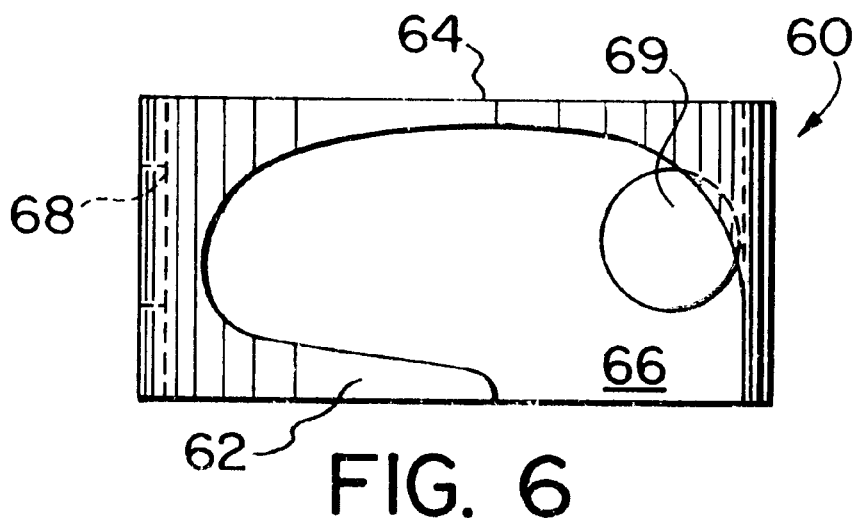
FIG. 6 is a side elevation of one form of vortex shaper.
Figure 7:
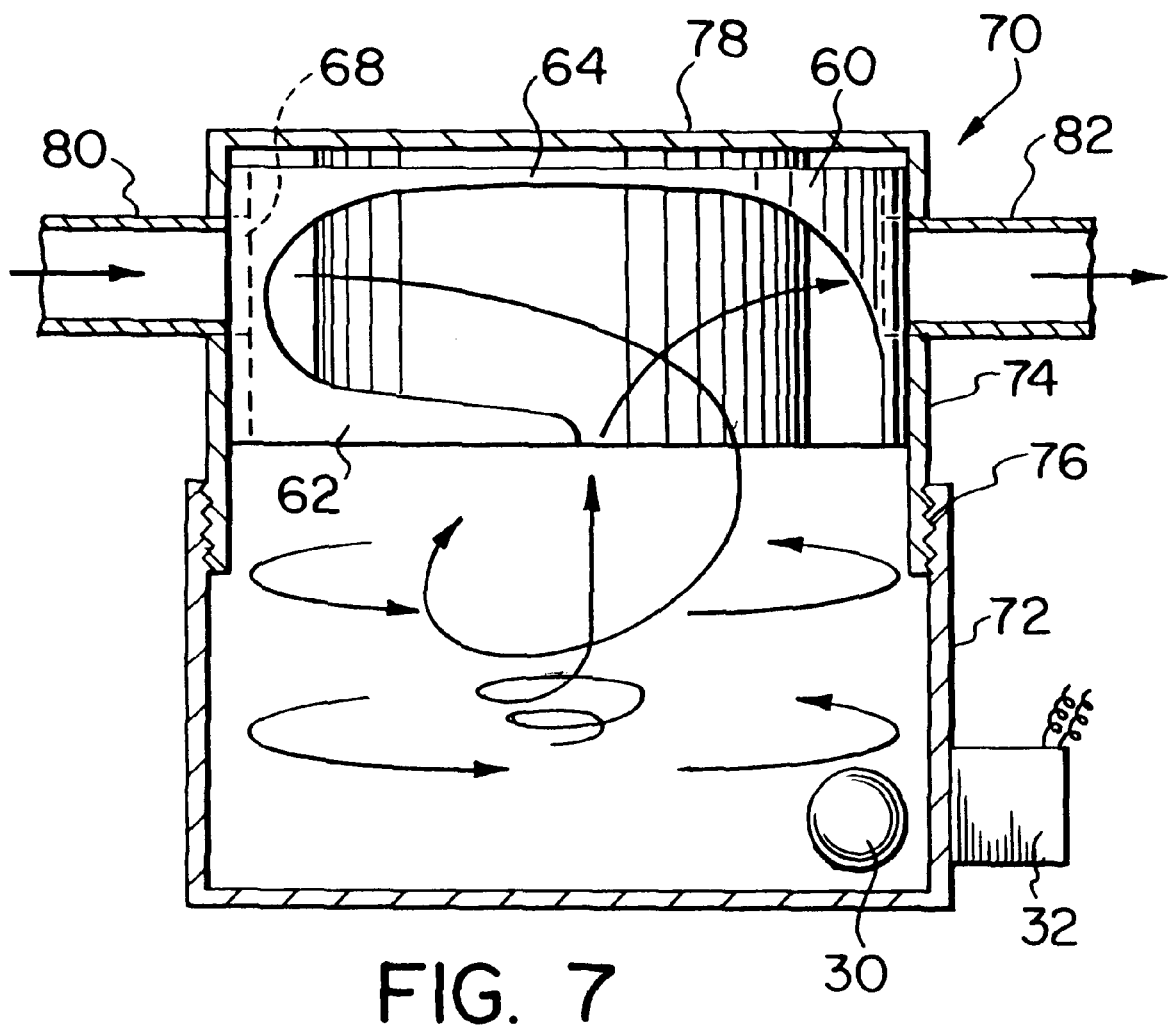
FIG. 7 is a cross-section through a modified form of chamber, with a shaper installed.

A typical example of one form of shaper is illustrated in FIG. 6, while a chamber with a shaper installed is illustrated in FIG. 7.

As illustrated in FIG. 6, and in FIG. 7, the shaper 60 is of a somewhat circular form, with a spiral-shaped wall 62 extending down from a top edge 64. The wall extends downward also at 66. Opposed apertures 68 and 69 are formed through the wall.

In the embodiments illustrated in FIGS. 1 to 3, the chamber has been shown as a unitary member, although normally the chamber would comprise two parts joined together.

FIG. 7 illustrates a modified form of chamber 70 having a base portion 72 and a top portion 74 joined by a threaded joint 76. The shaper 60 is situated in the top portion 74 with the top edge 64 adjacent the top surface 78 of the top portion.

Inlet 80 and outlet 82 are formed in the top portion aligned with the apertures 68 and 69.

The shaper can be a separate member held in the top portion, or can be moulded integrally with the top portion.

While the previously described embodiments have advantages over the prior art in that, as stated above, they are self-cleaning and non-clogging, among other advantages, under some circumstances operation of the flow detector can be improved by arranging for the detector to be fed a "cleaned" portion of the main flow. One such circumstance, for example, could be where the material carried in the flow would effect the signal generator.

Figure 8:
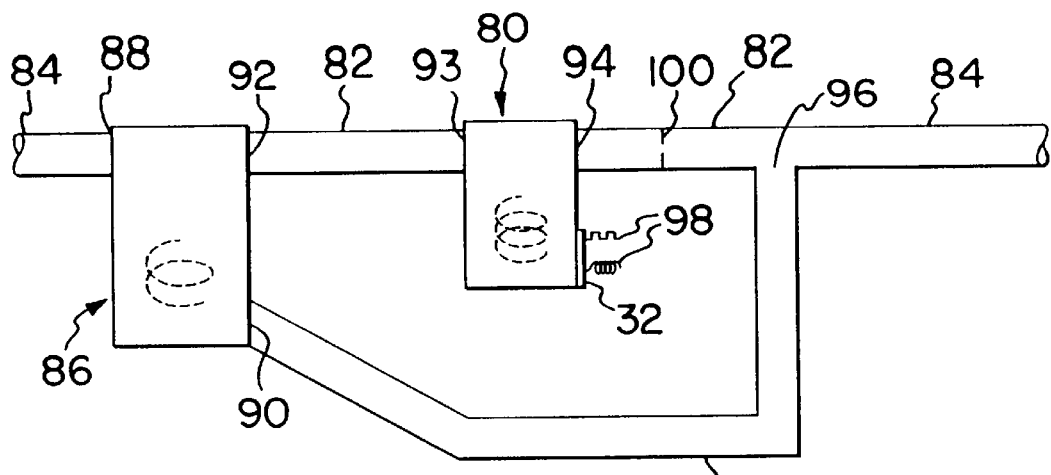
FIG. 8 is a schematic illustration of a further embodiment.

FIG. 8 illustrates schematically an arrangement in which the flow detector, indicated generally at 80, and of the form illustrated in FIG. 1 or FIG. 3 for example, is positioned in a by-pass 82, the main flow indicated at 84. The by-pass is connected to the main flow, at its upstream end, via a cyclonic separator 86. The main flow enters the separator at inlet 88 and exits at an outlet 90. A separated and "clean" flow enters the by-pass at an outlet 92. This by-pass flow will have a large part of any contained matter in the main flow removed. The amount of such matter left in the by-pass flow will depend upon the separator 86.

The by-pass flow enters the flow detector 93 and exits at 94 rejoining the main flow at 96. Sensor 32 detects movement of movable member in the flow detector, with an output at 98. It will be appreciated that such an arrangement as in FIG. 8 provides a cleaner flow of fluid to the flow detector. At the same time there is a definite ratio between the measured flow in the by-pass and the flow around the by-pass and thus a direct relationship between the measure flow and the total flow.

An orifice 100, positioned downstream of the flow detector 80 provides a desired differential pressure between the inlet 88 of the separator 86 and the flow detector 80, this pressure resulting in the fluid containing particulates circulating in the separator 86.

Figure 9:
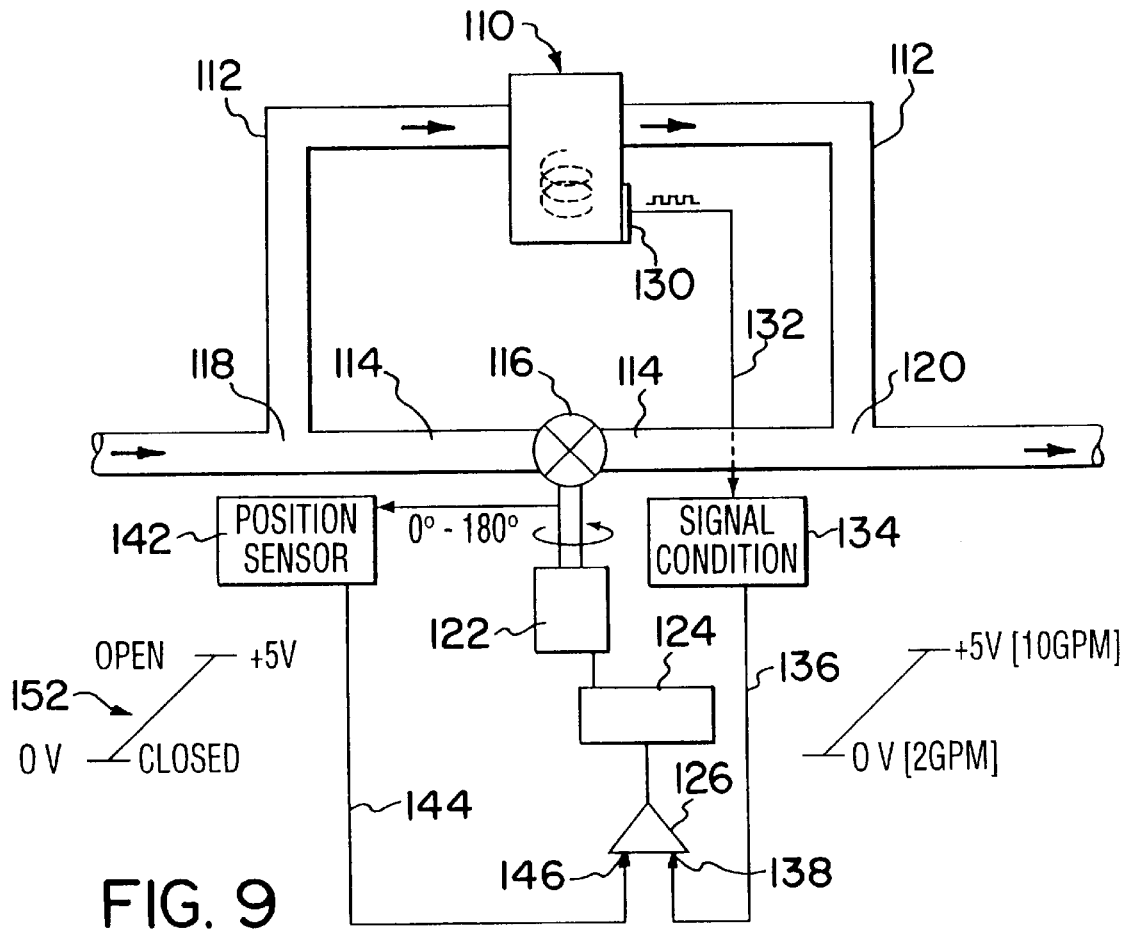
FIG. 9 is another schematic illustration of another embodiment.

FIG. 9 illustrates an arrangement for providing a very wide turndown/by-pass rangeability. In this example, a flow detector 110 of the form illustrated in FIG. 1 or FIG. 3, for example, is situated in one flow line 112, while the remaining flow flows through a flow line 114. For convenience, to provide consistency in terminology, flow line 114 will be considered as the by-pass. The flow through the main line 114 is controlled by a variable opening valve 116, positioned between the two connections 118 and 120 of the flow line 114. The valve is actuated by a motor 122, rotary or linear for example which in turn receives a drive signal from a drive signal generator 124. The drive signal generator receives an input signal generated by a differential amplifier 126.

A flow sensor 130 on the flow detector 110, sends a pulsed signal via connection 132 and signal conditioner 134 and then via connection 136 to one input 138 of the differential amplifier 126. The signal conditioner 134 converts the signal from the sensor 130, generally of a pulsed-type of signal, to a voltage signal, the value varying from 0 at no flow to a predetermined maximum voltage, say 5 volts, at full flow.

A position sensor 142 senses the movement of the drive through the valve 116 and produces a signal which is related to the opening of the valve 116. The position sensor 142 produces a voltage signal which varies from 0 when the valve is closed to a predetermined maximum voltage, again for example 5 volts, at full opening. From the position sensor 142, the signal is fed via connection 144 to another input 146 of the differential amplifier 126. The differential amplifier 126 compares the two signals, in a known manner, and produces an output signal to the drive signal generator 124, which in turns controls the motor 122 and thus the opening of the valve 116 to maintain parity between the signals from the motion sensor 130 and position sensor 142. The signals in the connections 136 and 144 are illustrated at 150 and 152 respectively.

In the arrangement as illustrated in FIG. 9, normally the predominance of the flow passes through the flow line 114. The positioning sensor, senses the position of the valve, converting position of the fully closed to fully open (0 to 180° for a ball valve). This, in the example, translates to a 0 to 5 volt signal. The output signal from the flow meter will also, in this example, be translated into a 0 to 5 volt signal for comparison. The order of event is as follows:

At low flow at 2 gpm, the valve 116 is closed with a minimum dc signal corresponding to the meter voltage at this flow. As the flow increases, the differential signal drives the motor 122 opening the valve 116 and yielding a voltage equalling that of the meter. This differential is a very gradual change in that the system is like trying to catch its tail but never really arriving. As the flow increases, the orifice continues to open. The net effect is that of changing what is called in the industry as "Turn Down Ratio" or "Rangeability" both terms being synonymous.

Most by-pass systems have a turn down ratio of not more than 10:1 and more commonly 5:1. With the variable orifice method described above, turn downs on the order of 100:1 may be obtained and as high as 1000:1 depending on the calibration desired.

The above principle can be utilized by any meter that has a conditioned signal. The circuits themselves are not unique in that there are many ways to accomplish the feedback and sensing as shown in FIG. 9.

The present invention provides both an apparatus and a method of detecting flow of fluid through a system by detecting movement of a member caused by a cyclonic or vortex flow in a chamber of a sensing device, the member caused to move by the flow. The sensing device is positioned in one of two flow lines in parallel which are combined to vary the total flow. For convenience and to provide consistency in terminology, the flow line in which the sensing device or flow detecting apparatuses is positioned is referred to as the by-pass flow line. By means of the "cyclonic" or vortex flow created in the chamber, a high speed flow is created at the inner peripheral surface of the chamber. This in turn creates movement of the movable member. The velocity of the movable member is related to the velocity of the fluid flow in the by-pass flow line. In turn this velocity is related to the flow in the system. By detecting the movement of the movable member, an output signal can be generated, by conventional means, which output signal is related to the velocity of movable member and thus is related to the velocity of the fluid flow in the by-pass and the total flow. Suitable treatment of the output signal can provide readings in any desired form.

Initial calibration of a new design will provide a correct correlation between the movement of the movable member and the fluid flow. A high level of accuracy and reproducibility is possible and is obtainable for each produced device to a common design without necessarily recelebrating each device.

Instead of using magnetic detection for the ball 30 or ring-shaped member 40, some form of transponder can be used, reflecting an externally generated signal.

Figure 10:
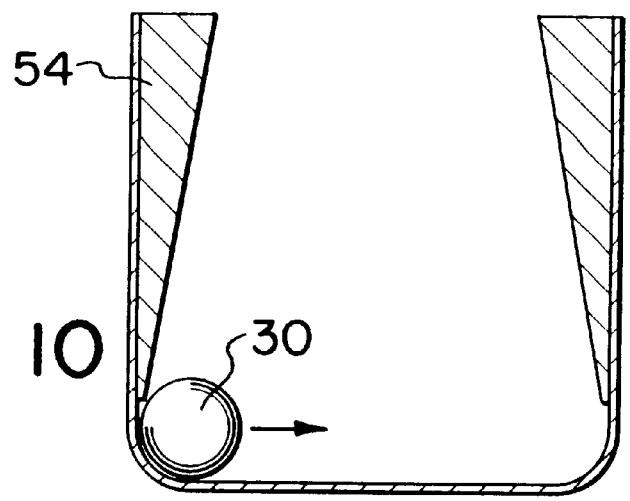
FIG. 10 is a schematic illustration of yet a further embodiment of the present invention.

Referring to additional embodiments of the present invention, FIG. 10 illustrates a variation on the embodiment in FIG. 3 wherein the stationary ring 54 of FIG. 3 is replaced by a tapered wall 54', the tapered wall 54' gradually decreasing in cross-sectional diameter of the chamber from the bottom to the top. In this manner, travel of the ball 30 up the walls of the chamber 10 is restricted.

Figure 11:
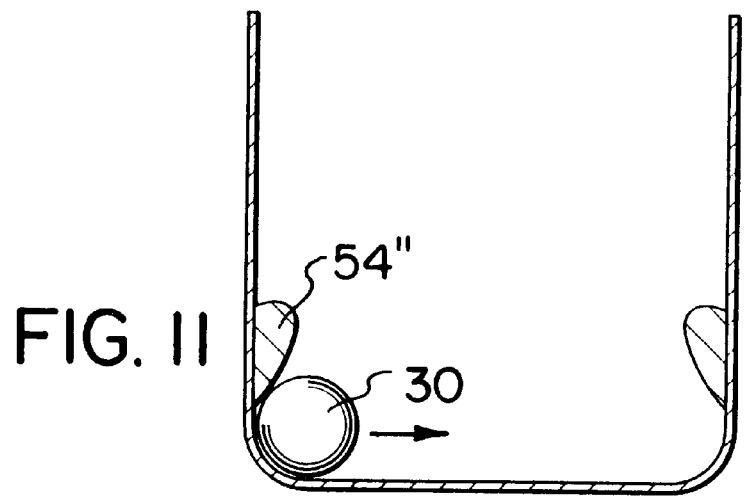
FIG. 11 is a schematic illustration of a further embodiment of the present invention.

FIG. 11 shows yet a further variation on this arrangement. Instead of the tapered wall 54', the same is replaced by an annular cam 54" to prevent the ball 30 from creeping upwardly in the chamber 10 from fluid force.

Figure 12:
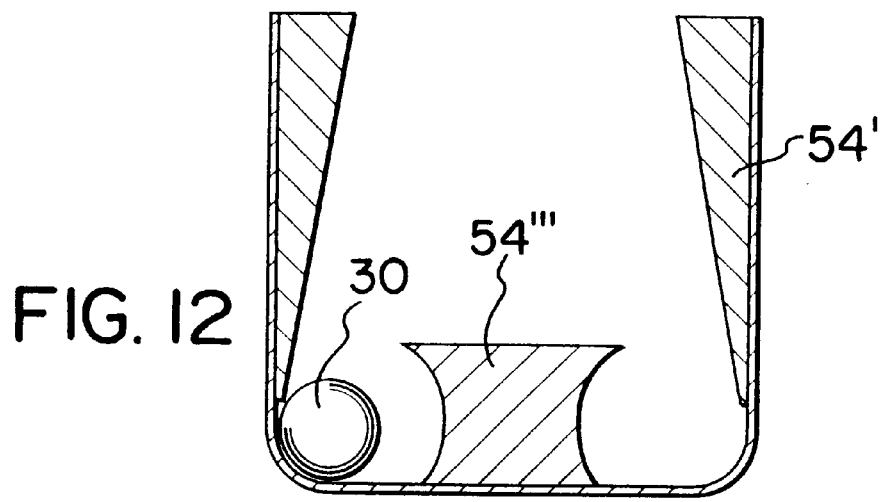
FIG. 12 is a schematic illustration of a still further embodiment of the present invention.

FIG. 12 illustrates yet another variation on the arrangement set forth in FIGS. 10 and 11. FIG. 12 combines the tapered wall segment 54', illustrated in FIG. 10, with a centrally disposed obstruction 54''' disposed on the bottom of the chamber. In this manner, the obstruction 54''' together with the tapered wall 54', define a pathway for the travel of ball 30 subscribing generally to an annulus or torus.

Figure 13:
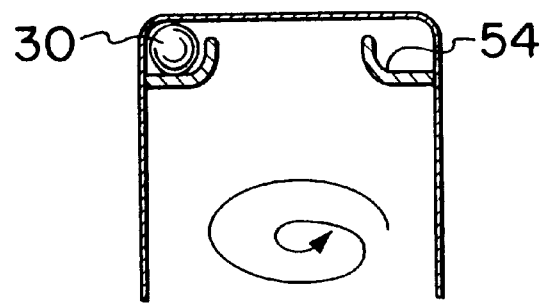
FIG. 13 is a schematic illustration of a further embodiment of the present invention.

With reference to FIG. 13, shown is a further variation on the arrangement shown in FIG. 3. In this embodiment, an annular ball retainer 54 is shown adjacent the top portion of the cylinder. Ball 30 is isolated for travel in this arrangement. It has been found that the vertical mounting with retainer 54 for ball 30 is useful to prevent hindrance of ball rotation by, for example, condensation, etc.

Figure 14:
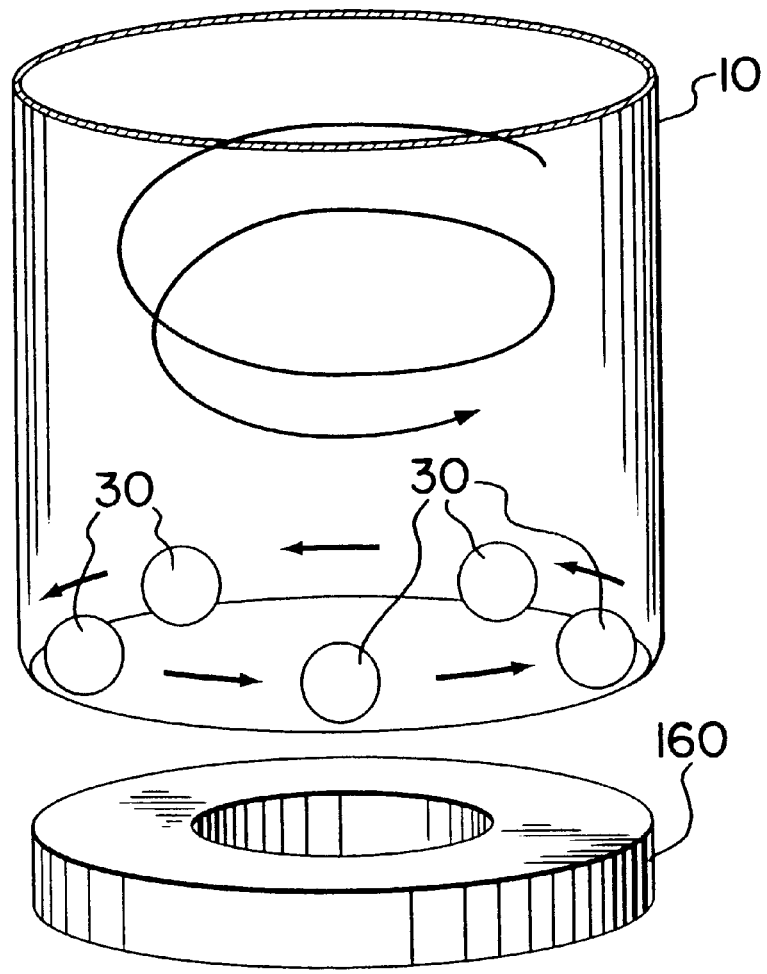
FIG. 14 is a schematic illustration of a further embodiment of the present invention.

Turning to FIG. 14, shown is a further embodiment of the present invention in schematic illustration. In the embodiment shown, the single ball meter has been modified to include several balls 30 and a generally ring-shaped magnet 160. The magnet 160 maintains spacing between the individual balls 30 and it has been found that the multiple ball system yields significantly better balance with minimum vibration and higher pulse output. These factors combine to produce enhanced resolution of the signal.

Although several balls 30 are shown in the drawing, it will be understood that depending on the degree of resolution required, the same may be reduced to two or more balls 30. It will also be understood that the embodiment in FIG. 13 includes the inlet, the outlet, the inlet design to cause cyclonic flow and the means to detect movement of the balls 30. These elements are common in FIG. 1. These elements have only been removed for clarity in this figure.

Although embodiments of the invention have been described above, it is not limited thereto and it will be apparent to those skilled in the art that numerous modifications form part of the present invention insofar as they do not depart from the spirit, nature and scope of the claimed and described invention.

We claim:

1. A fluid flow detecting apparatus, comprising:
   a main fluid flow line;
   a by-pass fluid flow line connected at each end to said main fluid flow line, and extending in a parallel flow relationship with said main fluid flow line, said by-pass fluid line having an inlet end and an outlet end, and a fluid flow detecting device positioned in said by-pass, said fluid flow detecting device including a cylindrical chamber having a peripheral wall and spaced opposed end walls;
   an inlet adjacent one of said end walls, and an outlet;
   said inlet adapted to cause a flow of fluid to circulate in said chamber;
   a movable member in said chamber and adapted to move with said flow of fluid;
   means for detecting movement of said movable member and producing a signal indicative of said movement; and
   a cyclonic separating device positioned in said main fluid flow line and having an inlet connected to said main fluid flow line upstream of said separating device, said separating device further having a first outlet connected to said inlet end of said by-pass flow line and a second outlet connected to said main flow downstream of said separating device, whereby a separated stream of fluid flows to said fluid flow detecting device.

2. A fluid flow detecting apparatus as set forth in claim 1, including an orifice in said by-pass fluid line downstream of said fluid flow detecting device.

3. A fluid flow detecting apparatus as set forth in claim 2, said movable member of magnetic material and said means for detecting movement comprising means positioned at said peripheral wall and including means for detecting passage of said movable member.

4. A fluid flow detecting apparatus as set forth in claim 2, said means for detecting movement of said movable member comprising an optical device, said optical device including means for detecting reflected light from said movable member and means for producing an output signal indicative of the passage of said movable member.

5. A fluid flow detecting apparatus as set forth in claim 2, said fluid flowing cyclonically and said member moving vertically in accordance with changes in fluid flow rate.

6. A fluid flow detecting apparatus as set forth in claim 1, said means for detecting passage of said movable member including magnetic detector and means for producing an output signal indicative of the passage of said movable member.

7. A fluid flow detecting apparatus as set forth in claim 1, wherein said peripheral wall includes means for limiting the vertical movement of said movable member in said chamber.

8. A fluid flow detecting apparatus as set forth in claim 7, wherein said means for limiting said vertical movement comprises a tapered peripheral wall.

9. A fluid flow detecting apparatus as set forth in claim 7, wherein said means for limiting said vertical movement comprises an annular cam.

10. A fluid flow detecting apparatus as set forth in claim 7, wherein said means for limiting said vertical movement comprises a tapered peripheral wall and a central member on one end wall of said opposed end walls; said central member and said tapered wall defining an annular path of travel for said movable member.

11. A fluid flow detecting apparatus as set forth in claim 10, said fluid flowing cyclonically in said chamber and said movable member comprising:
   a movable annular member positioned in said chamber;
   means for producing rotation of said annular member about a central axis of said chamber by said fluid flow, and at least one signal generating member on said annular member and means at said peripheral wall for detecting passage of said signal generating member.

12. A fluid flow detecting apparatus as set forth in claim 11, including a fixed annular member spaced from the other one of said end walls, said movable annular member positioned between said fixed annular member and said other end wall.

13. A fluid flow detecting apparatus as set forth in claim 1, including a variable opening valve in said main flow line, positioned between said inlet end and said outlet end of said by-pass flow line, drive means for opening and closing said valve, means for detecting the opening and closing of said valve and producing a signal indicative of the degree of opening of said valve, signal producing means for producing a drive control signal for said drive means, said signal producing means having a first input for receiving said signal indicative of the degree of opening of said valve, means for conditioning said signal indicative of movement of said movable member, said signal producing means having a second input for receiving the conditioned signal indicative of said movement of said movable member, whereby the by-pass flow has a predetermined relationship with the flow in the main fluid flow line.

14. A fluid flow detecting apparatus as set forth in claim 13, said signal producing means including a differential amplifier, said differential amplifier including said first and second inputs.

15. A fluid flow detecting apparatus as set forth in claim 13, said movable member of magnetic material and said means for detecting movement comprising means positioned at said peripheral wall and including means for detecting passage of said movable member.

16. A fluid flow detecting apparatus as set forth in claim 13, said means for detecting passage of said movable member including magnetic detector and means for producing an outlet signal indicative of the passage of said movable member.

17. A fluid flow detecting apparatus as set forth in claim 13, said means for detecting movement of said movable member comprising in optical device, said optical device including means for detecting reflected light from said movable member, and means for producing an output signal indicative of the passage of said movable member.

18. A fluid flow detecting apparatus as set forth in claim 13, said fluid flowing cyclonically and said member moving vertically in accordance with changes in fluid flow rate.

19. A fluid flow detecting apparatus as set forth in claim 13, said fluid flowing cyclonically in said chamber and said movable member comprising a movable annular member positioned in said chamber; means for producing rotation of said annular member about a central axis of said chamber by said fluid flow and at least one signal generating member on said annular member; and means at said peripheral wall for detecting passage of said signal connecting member.

20. A fluid flow detecting apparatus as set forth in claim 19, including a fixed annular member spaced from said other end wall, said movable annular member positioned between said fixed annular member and said other end.

21. A method of detecting flow in a fluid flow line, comprising:
providing a by-pass flow line in parallel to a main flow line;
positioning a fluid flow detecting device in said by-pass flow line, said detecting device including a cylindrical chamber;
feeding said flow into and through said cylindrical chamber to form a cyclonic flow pattern;
moving a movable member in said chamber by said cyclonic flow and detecting the movement of said movable member.

22. A method as set forth in claim 21, including positioning a cyclonic separator in said main flow line and feeding a separated flow from said separator into said by-pass flow line.

23. A method as set forth in claim 21, including positioning a variable opening valve in said main flow line in parallel with said by-pass flow line;
producing a signal indicative of the degree of opening of said valve;
producing a signal indicative of the movement of said movable member;
feeding said signals to a drive control signal generator and combining said signals to produce a drive control signal; and
applying said drive control signal to a drive means for controlling the opening of said valve;
the flow in said by-pass flow line and in said main flow line having a predetermined relationship.

24. A method as set forth in claim 21, said movable member of magnetic material, said means for detecting movement of said movable member comprising means for detecting passage of said member and including means for producing an output signal indicative of said passage.

25. A method as set forth in claim 21, said movable member comprising an annular member positioned adjacent an end wall of said chamber, including rotating said annular member about the central axis normal to the plane of said annular member.

26. A method as set forth in claim 21, including shaping said cyclonic flow into a desired pattern.

* * * * *